United States Patent
Bolavage et al.

(10) Patent No.: US 6,509,828 B2
(45) Date of Patent: Jan. 21, 2003

(54) INTERROGATING TAGS ON MULTIPLE FREQUENCIES AND SYNCHRONIZING DATABASES USING TRANSFERABLE AGENTS

(75) Inventors: Joseph T. Bolavage, Burke, VA (US); James E. Lawlor, Centerville, VA (US); Robert K. Valentino, Leesburg, VA (US)

(73) Assignee: PRC Inc., McLean, VA (US)

( * ) Notice: Subject to any disclaimer, the term of this patent is extended or adjusted under 35 U.S.C. 154(b) by 0 days.

(21) Appl. No.: 09/126,016

(22) Filed: Jul. 30, 1998

(65) Prior Publication Data

US 2002/0084889 A1 Jul. 4, 2002

(51) Int. Cl.[7] ................................................ H04Q 5/22
(52) U.S. Cl. .................... 340/10.1; 340/10.2; 340/10.6; 709/202; 709/203; 709/224; 707/3; 707/10; 705/28
(58) Field of Search ............................... 340/10.1, 10.2, 340/10.6; 709/202, 203, 224; 370/352; 707/10, 104, 3; 705/28

(56) References Cited

U.S. PATENT DOCUMENTS

| | | | | |
|---|---|---|---|---|
| 5,363,425 A | * | 11/1994 | Mufti et al. | 379/38 |
| 5,519,381 A | * | 5/1996 | Marsh et al. | 340/10.2 |
| 5,633,875 A | * | 5/1997 | Hershey et al. | 340/10.2 |
| 5,640,151 A | * | 6/1997 | Reis et al. | 340/10.2 |
| 5,774,876 A | * | 6/1998 | Woolley et al. | 340/10.6 |
| 6,076,099 A | * | 6/2000 | Chen et al. | 709/202 |
| 6,101,180 A | * | 8/2000 | Donahue et al. | 370/352 |

FOREIGN PATENT DOCUMENTS

| | | |
|---|---|---|
| WO | WO94/10663 | 5/1994 |
| WO | WO98/33126 | 7/1998 |

OTHER PUBLICATIONS

Lim, et al. "A Study on the Design of Large–Scale Mobile Recording and Tracking Systems", IEEE, Proc. 31st Annual Hawaii International Conference on Systems Sciences, 1998, pp. 701–710.

Barry Cornelius "Using CORBA and JDBC to P:roduct Three Tier Systems", Selected Papers from the Java in the Computing Curriculum Conference, Apr. 1998, pp. 44–52.

R.J. Bayardo, Jr., et al. InfoSleuth: Agent–Based Semantic Integration of Information in Open and Dynamic Environments, Microelectronics and Computer Technology Corporation, 1997, pp. 195–206.

\* cited by examiner

Primary Examiner—Brian Zimmerman
Assistant Examiner—Yves Dalencourt
(74) Attorney, Agent, or Firm—Lowe Hauptman Gilman & Berner

(57) ABSTRACT

A smart interrogator can communicate with RF tags on multiple frequencies and bandwidths and can communicate with tags from various manufacturers and thus permits assets if to be tracked even if the assets are being tracked using tags from different manufacturers. The smart interrogators communicate with a logistics server via the Internet using transferable agents that forward tag information from the interrogator to the logistics server via a Java data base connection (JDBC). The logistics server communicates with a logistic server database where transaction information from the tags is logged. The information from the interrogator is forwarded to appropriate external server and networks over the Internet. A client can query the logistics server to determine the whereabouts and status of a particular asset. The logistics server can spawn a transferable agent to locate the asset.

44 Claims, 3 Drawing Sheets

INTERROGATING TAGS ON MULTIPLE FREQUENCIES AND SYNCHRONIZING DATABASES USING TRANSFERABLE AGENTS

FIELD OF THE INVENTION

The present invention relates generally to radio frequency identification systems, and more particularly, to automatic interrogation technology on multiple bandwidths and multiple frequencies.

BACKGROUND OF THE INVENTION

Radio Frequency Identification (RFID) is a type of automated data collection technology. Because of its ability to track moving objects, Radio Frequency Identification is also used in many applications including livestock identification and automated vehicle identification (AIR) systems. Wireless automated data collection systems allow for noncontact reading and consequently are effective in manufacturing and other hostile environments and can be used as a replacement for bar code labels.

RFID systems basically include three components: an antenna or coil, a transceiver (with decoder), and a transponder, commonly called an RF tag, that is electronically programmed with unique information.

In operation, the antenna emits radio signals to activate the tag and read and write data to the tag. Antennas are the conduits between the tag and the transceiver. Antennas are available in a variety of shapes and sizes; for example, the antenna can be built into a door frame to receive tag data from persons or things passing through the door, or mounted on a pole or overhead frame to track traffic passing by on a freeway. The electromagnetic field produced by an antenna can be constantly present when multiple tags are expected continually. If constant interrogation isn't required, the field can be activated by a sensor device.

The antenna is typically packaged with the transceiver and decoder to become a reader, often called an interrogator. The interrogator can be configured either as a handheld or a fixed-mount device. The interrogator emits radio waves in ranges of anywhere from one inch to 100 feet or more, depending upon the power output and of the interrogator and the radio frequency used. When an RFID tag passes through the electromagnetic zone, the tag detects the interrogator's activation signal. The interrogator decodes the data encoded in the tag's integrated circuit (silicon chip) and the data is passed to a host computer for processing.

RFID tags come in a wide variety of shapes and sizes. Animal tracking tags, inserted beneath the skin, can be as small as a pencil lead in diameter and one half inch in length. Tags can be screw-shaped to identify trees or wooden items, or credit-card shaped for use in access applications. The anti-theft hard plastic tags attached to merchandise in stores are also RFID tags, as are heavy-duty five by four by two inch rectangular transponders used to track intermodal containers, or heavy machinery, trucks, and railroad cars for maintenance and tracking applications.

There are two categories of tags: active and passive. Active tags are powered by an internal battery and are typically read/write, i.e. tag data can be rewritten and/or modified. An active tag's memory size varies according to application requirements; some systems operate with up to one megabyte of memory. In a typical read/write RFID work-in-process system, a tag might give a machine a set of instructions, and the machine would then report its performance back to the tag. This encoded data would then become part of the tagged part's history.

Passive RFID tags operate without a separate internal power source and obtain operating power generated from the reader. Passive tags are consequently much lighter than active tags, less expensive, and offer a virtually unlimited operational lifetime. The trade-off is that passive tags have shorter read ranges than active tags and require a higher-powered reader. Passive tags are typically read-only and are programmed with a unique set of data (usually 32 to 128 bits) that cannot be modified. Read-only tags most often operate as a license plate into a database, in the same way as linear bar codes reference a database containing modifiable product-specific information.

There are many RFID systems having many frequency ranges. Low-frequency (30 to 500 KHz) systems have short reading ranges and lower system costs. Low-frequency systems are most commonly used in security access, asset tracking, and animal identification applications. High-frequency (850 to 950 MHz and 2.4 to 2.5 GHz) systems, offering long read ranges (greater than 300 feet) and high reading speeds, are used for such applications as railroad car tracking and automated toll collection. However, the higher performance of high-frequency RFID systems incurs higher system costs.

The significant advantage of all types of RFID systems is the non-contact, non-line-of-sight nature of the technology. Tags can be read through a variety of substances such as snow, fog, ice, paint, crusted grime, and other visually and environmentally challenging conditions, where bar codes or other optically read technologies would be useless. RFID tags can also be read in challenging circumstances at remarkable speeds, in most cases responding in less than 100 milliseconds. The read/write capability of an active RFID system is also a significant advantage in interactive applications such as work-in-process or maintenance tracking. Though it is a costlier technology (compared with bar code), RFID has become indispensable for a wide range of automated data collection and identification applications that would not be possible otherwise.

The proliferation of incompatible RFID systems has caused problems. Each RFID vendor offers a proprietary system, with the result that various applications and industries have standardized on different vendors' competing frequencies and protocols. The current state of RFID standards is severe Balkanization—standards based on incompatible RFID systems exist for rail, truck, air traffic control, and tolling authorities usage, as well as for the U.S. Intelligent Transportation System and the DOD's Total Asset Visibility system, among other special-interest applications. Although a number of organizations have been working to address and hopefully bring about some commonality among competing RFID systems, there is still no common industry standards. Thus, there is a pressing need to integrate the various RFID systems so that various assets can be tracked by a single system. The inventors are not aware of a single interrogator that can perform multi-bandwidth interrogation. Further, current interfaces to remotely access data are very complex or non-existent.

SUMMARY OF THE INVENTION

It is, therefore, an object of the present invention to provide a method and apparatus which assets distributed around the world can be located in real time or near real time.

It is another object of the present invention to provide an interrogator which can read/write to tags from different manufacturers on multiple band widths and on multiple frequencies.

It is another object of the present invention to provide a system which can update a data warehouse which includes information about each of the distributed assets in near real time.

It is another object of the present invention to be able to update a corporate database across the Internet.

These and other objects of the present invention are achieved by providing a smart interrogator which can communicate with RF tags on multiple frequencies and bandwidths. Advantageously, the smart interrogator can communicate with tags from various manufacturers and thus permits assets to be tracked even if the assets are being tracked using tags from different manufacturers. This eliminates the need to track assets using many different interrogators. The smart interrogators communicate with a logistics server via the internet using transferable agents. The agents forward information from the tag to the logistics server. A Java database connection (JDBC) is established between the logistics server and the smart interrogator. The log server records transaction information in the data warehouse and forwards asset data to registered client databases. A client can query the logistics server to determine the whereabouts of a particular asset. The logistics server can spawn a transferable agent to locate the asset. If the asset cannot be located while the client is logged onto the logistics server, then the transferable agent will push the information back to the logistics server. The client will then be updated with the information pushed back by the transferable agent. The transferable agents can be used to forward information from the logistics server to other servers and clients.

The foregoing objects are also achieved by a method of locating assets over the internet with each asset having an associated tag. Tags are interrogated on multiple frequencies. Information about the associated asset is transmitted, from one or more of the tags. The transmitted information is received and forwarded over the internet to registered client databases.

The foregoing objects are also achieved by an article, comprising at least one sequence of machine executable instructions. A medium bears the executable instructions in machine readable form wherein execution of the instructions by one or more processors causes the one or more processors to interrogate tags on multiple frequencies. Information about the associated asset is transmitted from one or more of the tags. The transmitted information is received and forwarded over the internet to registered client databases.

The article could also comprise instructions which cause the one or more processors to set up a database connection at a location wherein the forwarded information is received at the database connection and deploy agents to forward the information over the internet.

The foregoing objects are also achieved by a computer architecture which includes interrogating means for interrogating tags on multiple frequencies. Transmitting means are provided, for transmitting from one or more of the tags, information about the associated asset. Receiving means are provided for receiving the transmitted information and forwarding the received information over the internet to registered client databases.

The computer architecture could also comprise setting up means for setting up a database connection at a location wherein the forwarded information is received at the database connection and agent means for deploying agents to forward the information over the internet.

The foregoing objects are also achieved by a computer system comprising a processor and a memory coupled to the processor, the memory having stored therein sequences of instructions, which, when executed by said processor, cause said processor to perform the steps of interrogating tags on multiple frequencies and transmit, from one or more of the tags, information about the associated asset and receive the transmitted information and forward the received information over the internet to registered client databases.

The computer system could also comprise instructions, which, when executed by said processor, cause said processor to perform the steps of setting up a database connection at a location wherein the forwarded information is received at the database connection and deploying agents to forward the information over the internet.

Still other objects and advantage of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for locating distributed assets over the internet according to the present invention are described. In the following description, for purposes of explanation, numerous specific details are set forth in order to provide a thorough understanding of the present invention. It will be apparent, however, that the present invention may be practiced without the specific details. In other instances, well-known structures and devices are shown in block diagram form in order to avoid unnecessarily obscuring the present invention.

Figure 1:
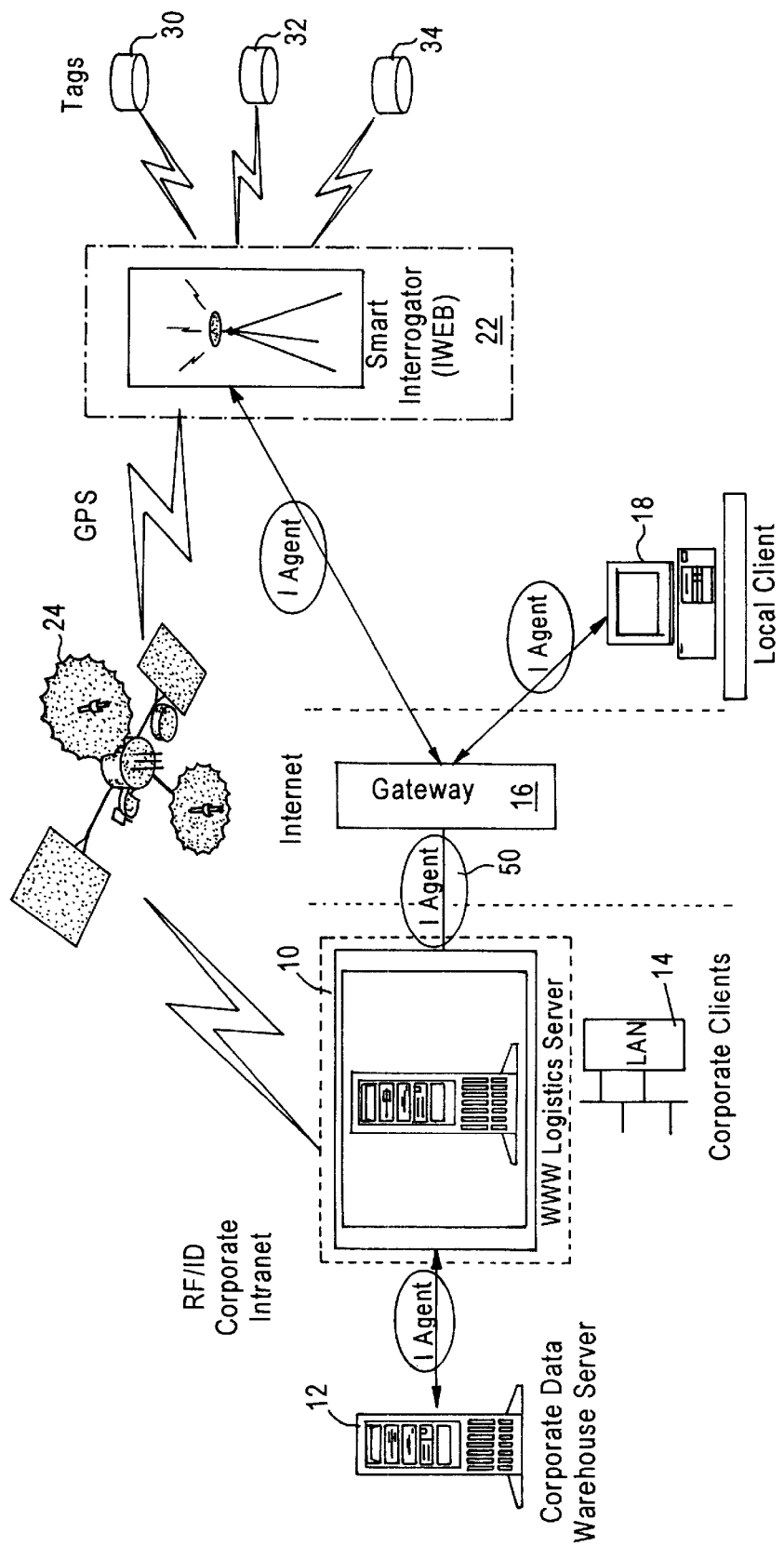
FIG. 1 is a schematic diagram of the hardware used in the present invention according to the present invention.

In FIG. 1, an overall block diagram schematic illustrates the hardware on which the present invention can be implemented. The overall system includes a logistic server 10 connected to a corporate data warehouse server 12 and to a local area network (LAN) 14. Logistic server 10 is connected to a gateway 16 which in turn is connected to a local client 18 and a smart interrogator 22. There may be many other clients 18. The smart interrogator 22 is connected to a plurality of tags 30, 32, 34. For purposes of explanation, only a single smart interrogator 22 is depicted, although the invention contemplates having many smart interrogators 22 distributed around the world. Further, although the smart interrogator 22 is depicted as connected to only three tags 30, 32, 34, each smart interrogator 22 can be connected to any number of tags.

Each smart interrogator 22 interrogates on multiple frequencies. As the smart interrogator 22 does not know on which frequencies tags 30,32, 34 can be interrogated, the interrogator 22 scans and interrogates a plurality of frequencies, corresponding to possible frequencies on which tags 30, 32, 34 might communicate. The interrogator 22 similarly does not know on which frequencies tags 30, 32, 34 can respond, so after interrogating it listens to a plurality of frequencies on which tags 30, 32, 34 might respond.

Intelligent Java database connectivity agents 50 are used to push data from the smart interrogator 22 to the logistic server 10. Information from the logistic server 10 can be transferred using an agent 50 to the local client 18 and to internal corporate clients on LAN 14. The information can include, for example, Electronic Data Interchange (EDI) transactions. The JDBC agent 50 is explained in greater detail below. The smart interrogator 22 can be either fixed or mobile. If mobile, the interrogator can have a global positioning system (GPS) chip and associated hardware for communicating its position using GPS to satellite 24 to provide information regarding the location of the interrogator 22. Because interrogator 22 usually has approximately a three hundred foot range, the location of interrogator 22 also provides an approximate location for the tags 30, 32, 34. Each smart interrogator 22 has a universal resource locator (URL). Users including corporate clients on LAN 14, local client 18 and international clients on WAN 26 can initiate Java agents 50 to crawl the I-web and look for assets. As used herein, the I-web refers to the portion of the internet connecting logistics server 10, the local client 18 and the smart interrogator 22. If the internet session ends before agent 50 returns, the agent 50 can instruct the logistic server 10 to push the data to the particular user or client 18. Users can also initiate an agent 50 to update tag-resident data. Barcode Scans should also feed the Logistic Server (or client for agent transfer). For each client 18 can initiate a query that may launch a server 10 spawned agent to locate an asset associated with a tag 30, 32, 34.

Advantageously, the present invention provides seamless links among various AIT's for customers who use different database management systems (DBMSs), a different operating systems, different hardware platforms. The present invention integrates the various AITs, specifically radio frequency identification, utilizing a client-server two tier architecture with Java database connectivity (JDBC) agents to dynamically update a corporate database 12 across the internet. This database is synchronized by the RFID tag and interrogator relay agent to the corporate virtual private internet (VPI) (see reference number 14). Each interrogator 22 is programmed with the unique URL address identifier that when queried will dynamically update the source data base and any client databases registered. A registered client database, such as local client 18, will be provided information via an intelligent agent which can be spawned by the logistics server 10.

The local client 18 is made from conventional hardware. Similarly, the WAN 26 is conventional. The smart interrogator 22 can read, write, collect and store information from the tags 30, 32, 34. The data will also be time stamped. The smart interrogator 22 can establish a JDBC connection with the logistic server 10 and update the logistic database server 12. The logistic database server 12 can be updated either on a timed basis or can be event driven and updated whenever the tags 30, 32, 34 have updated information. The smart interrogator 22 can spawn and can pass agents 50 through the I-web. Further, the smart interrogator 22 can accept a JDBC connection from the logistic server 10 and receive queries from clients 18 via logistics server 10 spawned agents 50.

JDBC™ is a Java™ API for executing SQL statements. JDBC includes a set of classes and interfaces written in the Java programming language. JDBC provides a standard API for tool/database developers and makes it possible to write database applications using a pure Java API.

Using JDBC, it is easy to send SQL statements to virtually any relational database. In other words, with the JDBC API, it is not necessary to write one program to access a Sybase database, another program to access an Oracle database, another program to access an Informix database, and so on. One can write a single program using the JDBC API, and the program will be able to send SQL statements to the appropriate database. With an application written in the Java programming language, one also does not have to worry about writing different applications to run on different platforms. JDBC is the mechanism for allowing Java applications to talk to a variety of different databases.

In the two-tier model, a Java applet or application talks directly to the database. This requires a JDBC driver that can communicate with the particular database management system being accessed. A user's SQL statements are delivered to the database, and the results of those statements are sent back to the user. The database will likely be located on another machine to which the user is connected via a network. This is referred to as a client/server configuration, with the user's machine as the client, and the machine housing the database as the server. The network can be an intranet, which, for example, connects employees within a corporation, or it can be the Internet.

Until now the middle tier has typically been written in languages such as C or C++, which offer fast performance. However, with the introduction of optimizing compilers that translate Java bytecode into efficient machine-specific code, it is becoming practical to implement the middle tier in Java.

HARDWARE OVERVIEW

Figure 2:
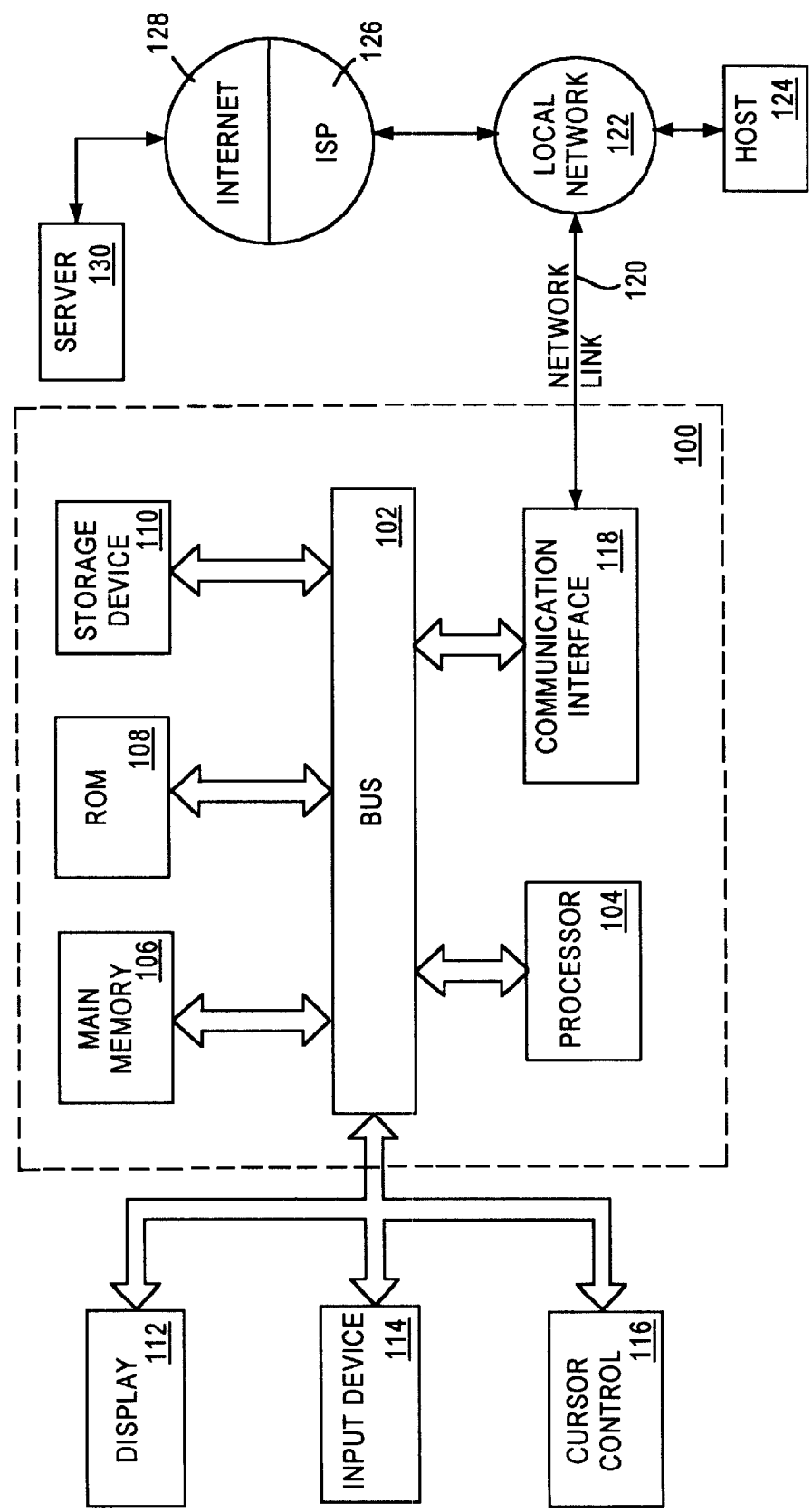
FIG. 2 is a high-level bock diagram of a computer system usable with the present invention.

FIG. 2 is a block diagram illustrating an exemplary computer system 100 upon which an embodiment o the invention may be implemented. The present invention is usable with currently available personal computers, mini-mainframes and the like. The computer system 100 can be a "presence" as described below.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display enterprise architecture information. According to one embodiment of the invention, enterprise architecture information and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the enterprise architecture information. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Figure 3:
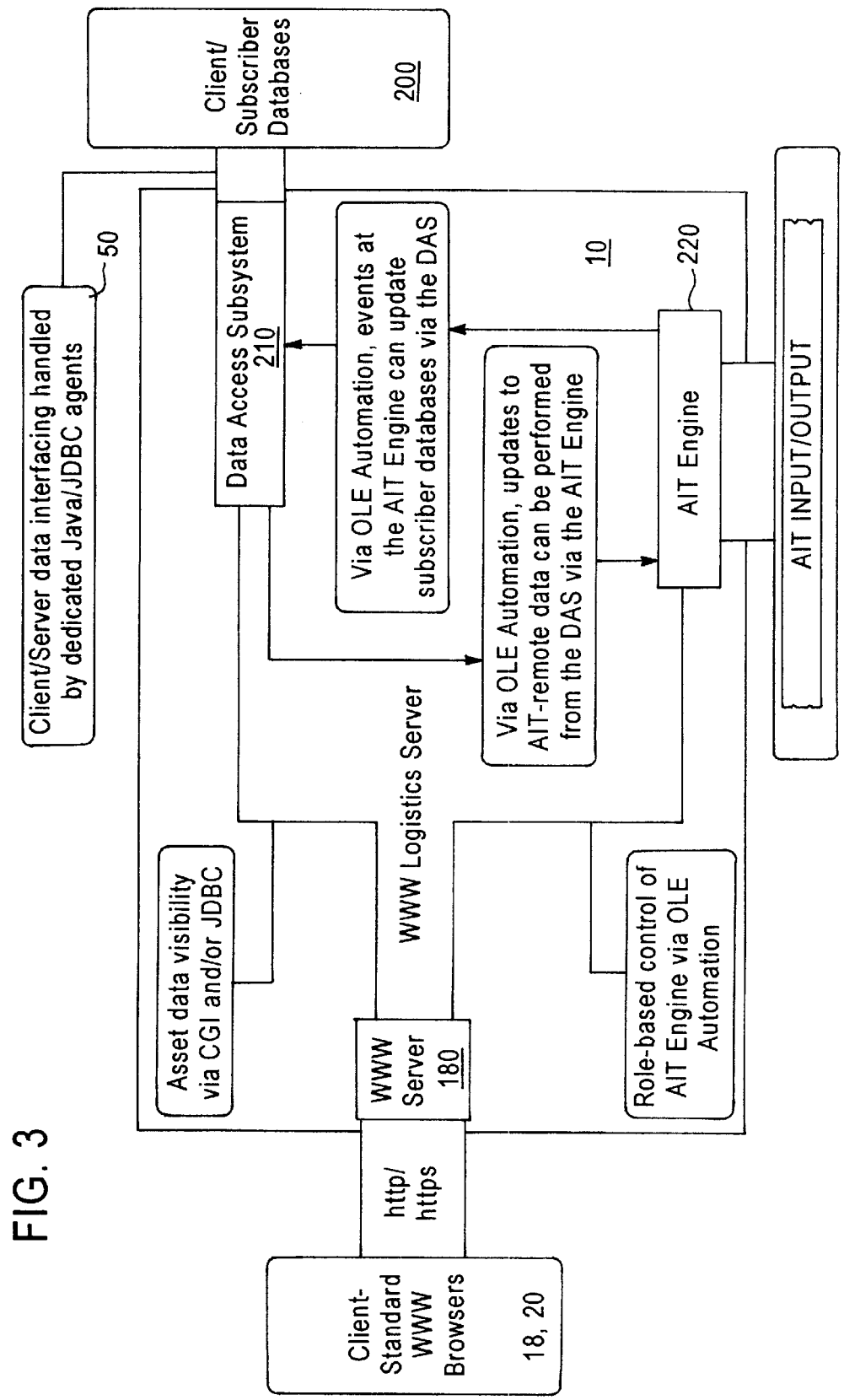
FIG. 3 is the logical architecture of the logistic server according to the present invention.

As depicted in FIG. 3, the logistic server 10 is illustrated in greater detail. The logistic server 10 is connected to external clients such as 18 via a www server 180 connected to the internet. Internal and external client server databases include corporate clients on the LAN 14, local client 18 and WAN 26 and are shown together in FIG. 3 as client/subscriber databases 200. The client/subscriber databases 200 are connected to a data access sub-system 210 within the logistic server 10 via dedicated Java/JDBC agents 50. An AIT (Automated Identification Technology) engine 220 is part of the logistic server 10 and interfaces to the smart interrogator 22 as depicted in FIG. 1. The AIT 220 allows client control of one or more interrogators 22. The data access subsystem 210 and the web server 180 communicate with each other via a Common Gateway Interface (CGI) and/or JDBC. CGI is the generic interface between the server and these server-side 'gateway' programs. The CGI specifies how data are sent to the gateway program (as environment variables or as data read, by the gateway program, from standard input) and what data are sent (in general, all the data sent by the client to the server, plus extra environment variables describing the status of the server). To return data back to the client program (the user's web browsers) the gateway program just writes data to its regular (standard) output. These data are sent back to the client, after some processing by the server to ensure they have the correct message headers describing the data and the state of the transaction.

The data access sub-system 210 and AIT engine 220 communicate with each other through object linking and embedding automation. Object linking and embedding is a compound document standard developed by Microsoft Corporation. It enables a programmer to create objects with one application and then link or embed the objects in the second application. Embedded objects retain their original format and links to the application that created them. Support for object and linking and embedding is built into the windows operating system. Using the OLE automation, events to AIT remote data can be performed from the data access subsystem 210 via the AIT engine. Via OLE automation, events at the AIT engine 220 can update subscriber databases via the data access sub-system 210. The AIT engine is connected to any type of AIT automation such as the previously described RFID tags or bar code scanners.

It should now be apparent that a system and method for locating distributed assets has been described. Advantageously, the present invention integrates different AIT systems and tags using different bandwidths and frequencies. This in turn permits client databases to be updated using transferable agents.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of locating distributed assets over the Internet with each asset having an associated tag, comprising:

interrogating tags on multiple frequencies, the tags being located in two or more communication regions;

transmitting, from one or more of the tags located in the two or more communication regions, information about the associated asset;

receiving the transmitted information and forwarding the received information over the Internet to registered client databases using a transferable agent; and querying from a client and spawning the transferable agent to search for assets using at least one interrogator which causes said transmitting and receiving steps.

2. The method of claim 1, comprising interrogating and transmitting over a plurality of RF links, each RF link being at a particular frequency.

3. The method of claim 1, comprising storing information about an asset on an associated tag.

4. The method of claim 1, wherein the interrogating step is performed by an IWEB smart interrogator.

5. The method of claim 3, wherein the information includes Electronic Data Interchange (EDI) transactions.

6. The method of claim 1, wherein the forwarding is performed by intelligent agents.

7. The method of claim 1, wherein the interrogating step is performed by scanning a plurality of frequencies.

8. The method of claim 1, wherein the interrogating step is followed by listening to a plurality of different frequencies, without specifying to the interrogated tags on what frequency to transmit.

9. The method of claim 6, wherein the agents are Java database connectivity agents.

10. The method of claim 6, wherein the agents are transferred between computers.

11. The method of claim 6, wherein the agents are spawned by an interrogator performing the interrogating step.

12. The method of claim 1, comprising reading information from the tags, writing information to the tags, collecting information from the tags and storing information read from the tags.

13. The method of claim 1, wherein the forwarding is performed periodically.

14. The method of claim 1, wherein the forwarding is performed each time information is received.

15. The method of claim 1, comprising spawning an agent at a logistics sere to search for assets using at least one interrogator.

16. The method of claim 1, wherein the interrogating step uses automatic identification technology.

17. The method of claim 2, wherein each of the RF links is approximately a 300 foot radius.

18. The method of claim 1; comprising tracking locations of tags by scanning the information forwarded to either the logistic server database or the at least one client database.

19. The method of claim 1; comprising spawning agents to update the logistic server database.

20. The method of claim 1, wherein each interrogator has a Universal Resource Locator.

21. The method of claim 1, comprising forwarding the information from the logistic server database to one or more client databases, and synchronizing the information between the logistic server database and the one or more client databases.

22. The method of claim 1, comprising:

setting up a database connection at a location and wherein the forwarded information is received at the database connection; and using agents to forward the information over the internet.

23. The method of claim 21, comprising communicating between the database connection and an AIT engine using object embedding and linking.

24. The method of claim 1, comprising:

setting up a database connection at a location wherein the forwarded information is received at the database connection; and deploying agents to forward the information over the internet.

25. An article for locating distributed assets with each asset having an associated tag, comprising:

at least one sequence of machine executable instructions;

a medium bearing the executable instructions in machine readable form, wherein execution of the instructions by one or more processors causes the one or more processors to:

interrogate tags on multiple frequencies, the tags being located in two or more communication regions;

transmit, from one or more of the tags located in the two or more communication regions, information about the associated asset; and receive the transmitted information and forward the received information over the Internet to a logistic database using a transferable agent;

wherein a query from a client spawns the transferable agent to search for assets using at least one interrogator which causes the transmitting and receiving of information.

26. The article of claim 25, comprising instructions which cause the one of more processors to:

set up a database connection at a location wherein the forwarded information is received at the database connection; and use agents to forward the information over the Internet.

27. A computer architecture for locating distributed assets with each asset having an associated tag, comprising:

interrogating means for interrogating tags on multiple frequencies, the tags being located in two or more communication regions;

transmitting means for transmitting from one or more of the tags located in the two or more communication regions, information about the associated asset; and receiving means for receiving the transmitted information and forwarding the received information over the Internet to a data warehouse using a transferable agent;

wherein a query from a client spawns the transferable agent to search for assets using at least one interrogator which causes the transmitting and receiving of information.

28. The computer architecture of claim 27, further comprising:

setting up means for establishing a database connection at a location wherein the forwarded information is received at the database connection; and agent means for deploying agents to forward the information over the Internet.

29. A computer system for locating distributed assets with each asset having an associated tag, comprising:

a processor; and a memory of coupled to said processor, the memory having stored therein sequences of instructions, which, when executed by said processor, cause said processor to perform the steps of:

interrogate tags on multiple frequencies, the tags being located in two or more communication regions;

transmit, from one or more of the tags located in the two or more communication regions, information about the associated asset; and receive the transmitted information and forward the received information over the Internet to a client data warehouse using a transferable agent;

wherein a query from a client spawns the transferable agent to search for assets using at least one interrogator which causes the transmitting and receiving of information.

30. The computer system of claim 28, further comprising instructions, which, when executed by said processor, cause said processor to perform the steps of:

set up a database connection at a location wherein the forwarded information is received at the database connection; and deploy agents to forward the information over the internet.

31. A method of locating distributed assets located in a plurality of communication regions with each asset having an associated tag, comprising:

querying for a location of a particular asset located in any one of the plurality of communication zones over the Internet;

interrogating tags on multiple frequencies in at least some of the plurality of communication zones until the location of the particular asset is located; and transmitting, from one or more of the tags located in the plurality of communication regions, information about the associated asset using a transferable agent;

wherein a query from a client spawns the transferable agent to search for assets using at least one interrogator which causes the transmitting and receiving of information.

32. The method of claim 31, comprising receiving the transmitted information and forwarding the received information over the internet to registered client databases.

33. The method of claim 31, further comprising pushing data from one communication zone in which the location of the particular asset has been located to a central server.

34. The method of claim 31, comprising pushing data from one communication zone in which the particular asset has been located directly to a client who performed said querying step.

35. The method of claim 1, further comprising locating an asset located in one of the two or more communication zones.

36. A method of locating distributed assets located in a plurality of communication regions with an asset having an associated tag, comprising:

querying for a location of a particular asset over the internet; and spawning an agent to crawl through the plurality of communication regions until the particular asset is located;

wherein a query from a client spawns the transferable agent to search for assets using at least one interrogator which causes the transmitting and receiving of information.

37. The method of claim 36, further comprising:

interrogating tags on multiple frequencies in at least some of the plurality of communication zones until the location of the particular asset is located; and transmitting, from one or more of the tags located in the plurality of communication regions, information about the associated asset.

38. The method of claim 1, wherein a communication region is defined as an interrogator and approximately a 300 foot radius surrounding the interrogator.

39. The article of claim 25, wherein a communication region is defined as an interrogator and approximately a 300 foot radius surrounding the interrogator.

40. The method of claim 27, wherein a communication region is defined as an interrogator and approximately a 300 foot radius surrounding the interrogator.

41. The computer architecture of claim 29, wherein a communication region is defined as an interrogator and approximately a 300 foot radius surrounding the interrogator.

42. The method of claim 31, wherein a communication region is defined as an interrogator and approximately 300 foot radius surrounding the interrogator.

43. The method of claim 36, wherein a communication region is defined as an interrogator and approximately a 300 foot radius surrounding the interrogator.

44. The method of claim 2, wherein the plurality of RF links are at more than one frequency.

* * * * *